(12) United States Patent
Hall et al.

(10) Patent No.: US 10,408,111 B2
(45) Date of Patent: Sep. 10, 2019

(54) SYSTEM AND METHOD TO DETECT AND RESPOND TO ICED SENSORS IN EXHAUST AFTER-TREATMENT SYSTEM

(71) Applicant: CUMMINS INC., Columbus, IN (US)

(72) Inventors: Tony James Hall, Bemus Point, NY (US); Joseph A. Hudson, Columbus, IN (US)

(73) Assignee: Cummins Inc., Columbus, IN (US)

(*) Notice: Subject to any disclaimer, the term of this patent is extended or adjusted under 35 U.S.C. 154(b) by 0 days.

(21) Appl. No.: 15/550,956

(22) PCT Filed: Jul. 13, 2015

(86) PCT No.: PCT/US2015/040170
§ 371 (c)(1),
(2) Date: Aug. 14, 2017

(87) PCT Pub. No.: WO2016/190890
PCT Pub. Date: Dec. 1, 2016

(65) Prior Publication Data
US 2018/0179940 A1 Jun. 28, 2018

(51) Int. Cl.
*F01N 9/00* (2006.01)
*F01N 3/021* (2006.01)
(Continued)

(52) U.S. Cl.
CPC .......... *F01N 9/00* (2013.01); *B01D 46/446* (2013.01); *B01D 53/944* (2013.01);
(Continued)

(58) Field of Classification Search
CPC .......... F01N 3/021; F01N 3/2066; F01N 9/00; F01N 9/002; F01N 11/00; F01N 11/002;
(Continued)

(56) References Cited

U.S. PATENT DOCUMENTS

| 5,349,936 A | 9/1994 | Uchinami |
| 6,192,866 B1 | 2/2001 | Araki |

(Continued)

FOREIGN PATENT DOCUMENTS

| DE | 4326351 | 2/1994 |
| EP | 2305977 | 6/2011 |

(Continued)

OTHER PUBLICATIONS

International Search Report and Written Opinion issued by the International Searching Authority, dated Oct. 1, 2015, for related International Patent Application No. PCT/US2015/040170; 10 pages.

*Primary Examiner* — Audrey K Bradley
(74) *Attorney, Agent, or Firm* — Faegre Baker Daniels LLP (57) ABSTRACT

A combustion system (100), a control module (104) for a combustion system (100) and a method of operating the combustion system (100) are disclosed. The method may be implemented by the control module (104) in the combustion system (100). The method comprises predicting an iced condition of the pressure sensor assembly (240); responsive to predicting the iced condition, controlling exhaust emissions without using a pressure parameter sensed with the pressure sensor assembly (240) in the iced condition; predicting a de-iced condition of the pressure sensor assembly (240); and responsive to predicting the de-iced condition, controlling the exhaust emissions using the pressure parameter sensed with the pressure sensor assembly (240) in the de-iced condition.

20 Claims, 4 Drawing Sheets

(51) Int. Cl.
   *F01N 11/00* (2006.01)
   *F01N 3/20* (2006.01)
   *F01N 13/00* (2010.01)
   *B01D 46/44* (2006.01)
   *B01D 53/94* (2006.01)

(52) U.S. Cl.
   CPC ..... *B01D 53/9418* (2013.01); *B01D 53/9477* (2013.01); *F01N 3/021* (2013.01); *F01N 3/2066* (2013.01); *F01N 9/002* (2013.01); *F01N 11/00* (2013.01); *F01N 11/002* (2013.01); *F01N 13/009* (2014.06); *B01D 2279/30* (2013.01); *F01N 2550/00* (2013.01); *F01N 2560/08* (2013.01); *F01N 2610/02* (2013.01); *F01N 2900/0416* (2013.01); *F01N 2900/0422* (2013.01); *F01N 2900/12* (2013.01); *F01N 2900/1404* (2013.01); *F01N 2900/1406* (2013.01); *F01N 2900/1602* (2013.01); *Y02T 10/24* (2013.01); *Y02T 10/47* (2013.01)

(58) Field of Classification Search
   CPC ............... F01N 13/009; F01N 2550/00; F01N 2560/08; F01N 2610/02; F01N 2900/0416; F01N 2900/0422; F01N 2900/12; F01N 2900/1404; F01N 2900/1406; F01N 2900/1602; B01D 46/446; B01D 53/9418; B01D 53/944; B01D 53/9477; B01D 2279/30; Y02T 10/24; Y02T 10/47
   See application file for complete search history.

(56) References Cited

U.S. PATENT DOCUMENTS

| | | | |
|---|---|---|---|
| 7,155,334 | B1 | 12/2006 | Stewart |
| 7,404,291 | B2 | 7/2008 | Endo |
| 7,934,374 | B2 | 5/2011 | Etcheverry |
| 8,640,445 | B2 | 2/2014 | Garimella |
| 8,707,807 | B2 | 4/2014 | Yadav |
| 2007/0234792 | A1 | 10/2007 | Durand |
| 2009/0288734 | A1 | 11/2009 | Barcin |
| 2011/0146233 | A1 | 6/2011 | Carlill |
| 2015/0240696 | A1* | 8/2015 | Saitou ................. G01M 15/106 |
| | | | 73/114.76 |

FOREIGN PATENT DOCUMENTS

| | | | | |
|---|---|---|---|---|
| JP | 2008163795 | | 7/2008 | |
| JP | 5688188 | B1 * | 3/2015 | .......... G01M 15/106 |

* cited by examiner

SYSTEM AND METHOD TO DETECT AND RESPOND TO ICED SENSORS IN EXHAUST AFTER-TREATMENT SYSTEM

CROSS-REFERENCE TO RELATED APPLICATIONS

The present application is a National phase entry of International Patent Application No. PCT/2015/40170, filed on Jul. 13, 2015, which claims the benefit of U.S. Provisional Patent Application No. 62/167,779, filed on May 28, 2015, the entire contents of said applications incorporated herein by reference.

TECHNICAL FIELD

The present invention relates generally to exhaust after-treatment systems, and more specifically to combustion engines and methods to detect and respond to malfunctions of exhaust after-treatment sensors.

BACKGROUND

Exhaust emissions from internal combustion engines contribute to pollution in the environment. In particular, nitrogen oxide and nitrogen dioxide (collectively, NOx) emissions contribute to smog and acid rain. NOx is a byproduct of the combustion of fossil fuels, and diesel engines generate NOx. Exhaust control systems include features configured to decompose NOx into environmentally friendly or friendlier components such as nitrogen and carbon dioxide. Legislative regulations limit the amount of NOx emissions that a combustion system may generate. Exhaust control systems maintain emissions below regulated levels. When exhaust control systems malfunction, operation of the combustion system is interrupted to effect maintenance or repairs. Such interruptions can be very costly. For example, a truck transporting goods may have to be towed to a maintenance facility hundreds of miles away to effect the repairs.

An exhaust after-treatment system includes a filtering device and a pressure sensor assembly that senses pressure parameters to determine soot loading and filtration efficiency of the filtering device. During cold conditions, water vapor can condense and freeze in pressure sensing tubes of the pressure sensor assembly, causing the pressure sensor assembly to generate pressure signals that are not representative of the condition of the filtration device and cause generation a fault signal. When the fault signal is generated, operation of the combustion system may be interrupted even though the pressure sensor assembly is not necessarily damaged.

There is a need for an improved control system that enables continued operation of the combustion system when iced condition conditions hinder operation of sensors configured to monitor the exhaust after-treatment system.

SUMMARY OF DISCLOSED EMBODIMENTS

Embodiments of the invention disclosed herein provide a combustion system, a method to operate a combustion system, and a control module structured to implement the method to operate the combustion system.

In one embodiment, the method to operate a combustion system comprises controlling exhaust emissions using a pressure parameter of a filtering device sensed with a pressure sensor assembly; predicting an iced condition of the pressure sensor assembly; responsive to predicting the iced condition, controlling the exhaust emissions without using the pressure parameter sensed with the pressure sensor assembly in the iced condition; predicting a de-iced condition of the pressure sensor assembly; and responsive to predicting the de-iced condition, controlling the exhaust emissions using the pressure parameter sensed with the pressure sensor assembly in the de-iced condition.

In one embodiment, the combustion system comprises a combustion engine generating exhaust gases; an exhaust subsystem structured to receive the exhaust gases from the combustion engine; a filtering device structured to remove particulate matter from the exhaust gases; and a pressure sensor assembly structured to sense a pressure parameter of the filtering device. The combustion system further comprises a control module including control logic structured to: predict an iced condition of the pressure sensor assembly, responsive to predicting the iced condition, control exhaust emissions without using the pressure sensed with the pressure sensor assembly in the iced condition, predict a de-iced condition of the pressure sensor assembly, and responsive to predicting the de-iced condition, control the exhaust emissions using the pressure parameter sensed with the pressure sensor assembly in the de-iced condition.

In one embodiment, a control module for a combustion system including a combustion engine and an exhaust subsystem configured to control exhaust emissions comprises control logic structured to: predict an iced condition of the pressure sensor assembly, responsive to predicting the iced condition, control exhaust emissions without using the pressure sensed with the pressure sensor assembly in the iced condition, predict a de-iced condition of the pressure sensor assembly, and responsive to predicting the de-iced condition, control the exhaust emissions using the pressure parameter sensed with the pressure sensor assembly in the de-iced condition.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

The above-mentioned and other disclosed features, the manner of attaining them, and the advantages thereof, will become more apparent and will be better understood by reference to the following description of disclosed embodiments taken in conjunction with the accompanying drawings, wherein.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION OF DISCLOSED EMBODIMENTS

A combustion system structured to implement an exhaust after-treatment control method is provided herein. The exhaust after-treatment control method alternates between a sensor control mode and a sensor-less control mode based on the likelihood of a pressure sensor assembly performing as expected or malperforming. When malperformance is expected or determined, the sensor-less control mode enables continued operation of the combustion system, thus avoiding unnecessary engine shut-downs and maintenance. Once the expectation or determination of malperformance is cleared, the sensor control mode of operation, which is the preferred mode of operation, controls operation of the exhaust subsystem. The malperformance diagnosis may be caused by an iced condition of sensing tubes of a pressure sensor assembly, for example.

In accordance with disclosed embodiments, malperformance of the pressure sensor assembly may be predicted based on ambient air temperatures, engine off-time, and extended idling or power take-off operation, for example. When malperformance due to an iced condition is predicted, generation of a fault signal is paused and the exhaust subsystem continues to operate without using pressure signals from the pressure sensor assembly. When a de-iced condition is determined or predicted, the exhaust subsystem returns to the sensor control mode using the pressure signals. A de-iced condition may be determined based on the generation of sufficient heat by the combustion engine to de-ice the sensing tubes, a determination that iced condition is no longer present, or a timer timeout which is configured to limit extended disablement of the fault signal.

Figure 1:
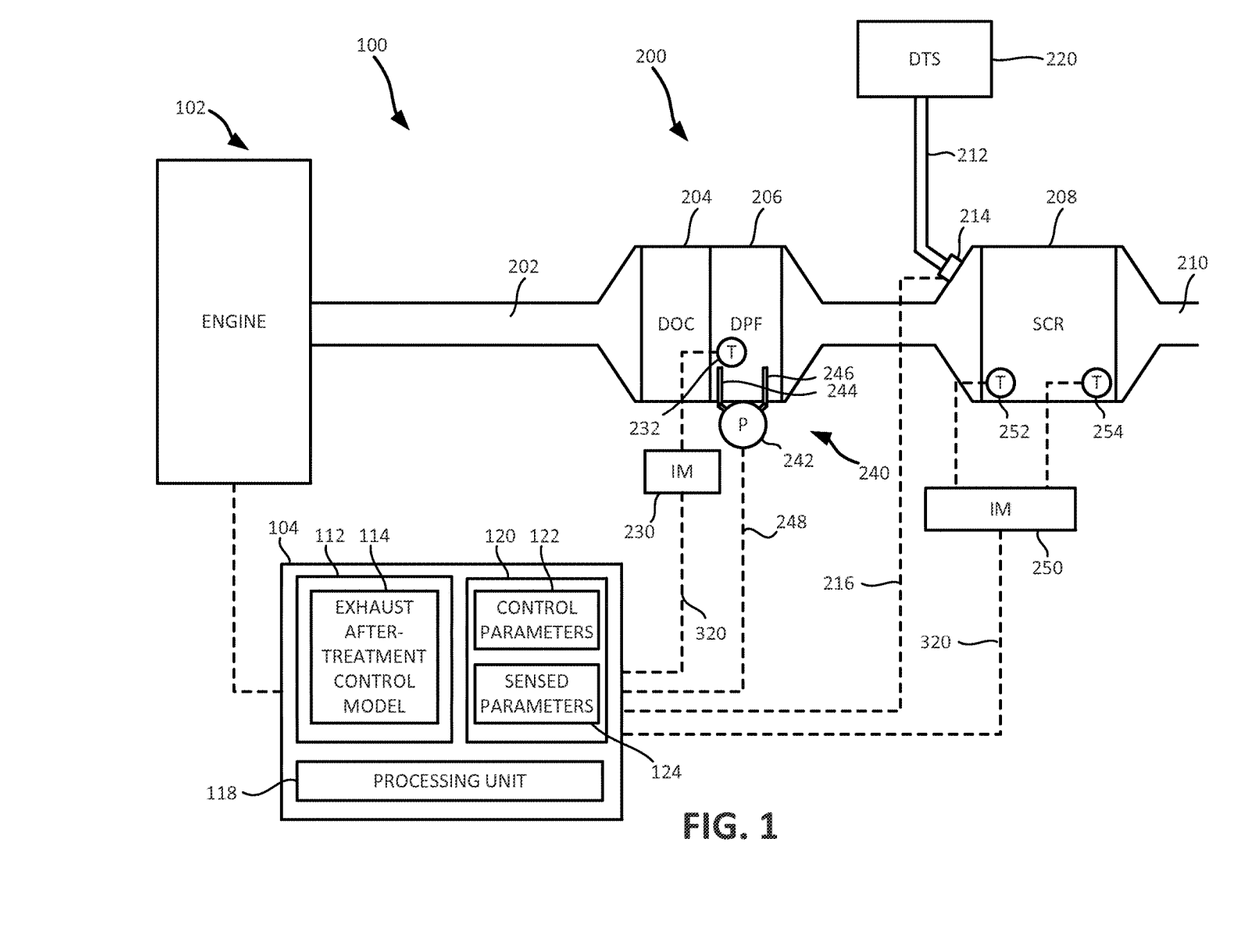
FIG. 1 is a schematic block diagram of an exemplary embodiment of combustion system.

The above-described features and advantages will now be described with reference to the figures. FIG. 1 is a schematic block diagram of an exemplary embodiment of combustion system 100 comprising combustion engine 102, engine control module (ECM) 104, and exhaust subsystem 200, which is structured to receive exhaust gases 202 generated by combustion engine 102 as after-products of combustion. In the present embodiment, exhaust after-treatment subsystem 200 includes diesel oxidation catalyst (DOC) 204, a filtering device exemplified as diesel particulate filter (DPF) 206 positioned downstream of DOC 204, and selective catalytic reduction (SCR) device 208 positioned downstream of DPF 206 and structured to remove NOx emissions from the exhaust gas. DOC 204 and DPF 206 may be any conventional oxidation catalyst and filtering devices well known in the art. Subsystem 200 also includes an absorber or catalyst and active catalytic components well known in the art. Dosing treatment supply (DTS) 220 supplies a reductant, such as ammonia or urea, through conduit 212 to dosing valve 214. Responsive to dosing control signals 216 from ECM 104, dosing valve 214 doses the reductant into SCR device 208 to promote catalytic conversion. The reductant is absorbed onto the SCR catalyst where it is used to convert the NOx emissions in the exhaust gas flow to nitrogen and water, and in the case of urea, also into carbon dioxide. The nitrogen and carbon dioxide gases are discharged through an exhaust conduit 210 to the environment. The pressure parameter represents soot and ash loading, but also backpressure from SCR device 208 which is indicative of crystal deposits build-up, which cause ECM 104 to increase dosing of reductant. Thus, malperformance of pressure sensor assembly 204 can result in incorrect and inefficient dosing ranges and emission controls.

Exhaust subsystem 200 further comprises pressure sensor assembly 240 connected to DPF 206 and structured to generate pressure signal 248 which is indicative of a pressure parameter of DPF 206. Pressure sensor assembly 240 includes tubes 244, 246 and pressure sensor 242 connected thereto. Pressure sensor 242 can sense a pressure parameter in DPF 206 via tubes 244, 246. Exemplary pressure parameters include the differential pressure between tubes 244, 246, and the pressure at one of tubes 244, 246, e.g. the outlet pressure of DPF 206. The pressure parameter is monitored by ECM 104 to determine when DPF 206 requires regeneration to maintain performance within prescribed parameters without causing premature or redundant regeneration, which is wasteful. Consequently, it should be understood that malperformance of pressure sensor assembly 240 can degrade performance of combustion system 100. ECM 104 may determine malperformance due to several causes. One cause of malperformance is the iced condition. The iced condition may result, for example, when water vapor in the exhaust gas freezes in one of tubes 244, 246, causing pressure sensor 242 to generate signals that do not correspond with the present condition of DPF 206. Another cause of malperformance is a damaged or incorrectly assembled pressure sensor assembly, e.g. pressure tubes assembled backward.

Exhaust subsystem 200 further comprises additional sensors and interface circuitry operable to determine the amount of heat provided by combustion engine 102 to exhaust subsystem 200 and conditions of exhaust gases 202. As shown in FIG. 1, exhaust subsystem 200 comprises DPF temperature sensor 232, and SCR temperature sensors 252 and 254. DPF temperature sensor 232 and SCR temperature sensors 252 and 254 are coupled to interface modules 230, 250, which convert the signals sensed by sensors 232, 252, and 254 to a format conveniently receivable by ECM 104. Exemplary sensors 232, 252, and 254 are thermocouples, which output low voltage signals. The low voltage signals are amplified and scaled by interface modules 230, 250 before transmission to ECM 104. Additional sensors (not shown) include mass-flow sensors, NOx sensors, and other sensors well known in the art for use in exhaust after-treatment systems. Mass-flow can also be determined via a well known speed density calculation based on air density and fuel flow rate.

ECM 104 includes control logic 112 comprising exhaust after-treatment control model 114, and memory 120 configured to store control parameters 122 and sensed parameter 124 of combustion system 100. Exemplary parameters include actual and predetermined amounts of heat provided by combustion engine 102 during a de-iced condition time, actual and predetermined amounts of heat not provided by combustion engine 102 during an iced condition time, a temperature and a low temperature threshold, an exhaust flow and an exhaust flow low threshold, an exhaust temperature and an exhaust temperature low threshold, a combustion engine low-load time and an engine low-load time threshold, predicted and actual values of the pressure parameter, an error threshold between the predicted and actual values of the pressure parameter, a de-iced condition time limit, a normal temperature threshold, a predetermined warm-up time, a differential pressure response rate, and an outlet pressure response rate, and other engine control parameters well known in the art.

As described further below, ECM 104 may comprise a portion of a control subsystem and may include a plurality of modules. In one variation of the present embodiment, ECM 104 includes processing unit 118, and control logic 112 comprises firmware executable by processing unit 118 to implement embodiments of a control method described herein. The firmware may comprise exhaust after-treatment control model 114. ECM 104 controls exhaust after-treatment subsystem 200 with signal 248 from pressure sensor assembly 240 when signal 248 is likely to correspond with the present condition of DPF 206 and without signal 248 when signal 248 is not likely to correspond with the present condition of DPF 206. In this manner, operation of combustions system 100 continues even when the present condition of DPF 206 may represent a malfunction. An embodiment of a control method is described below with reference to FIG. 2.

Figure 2:
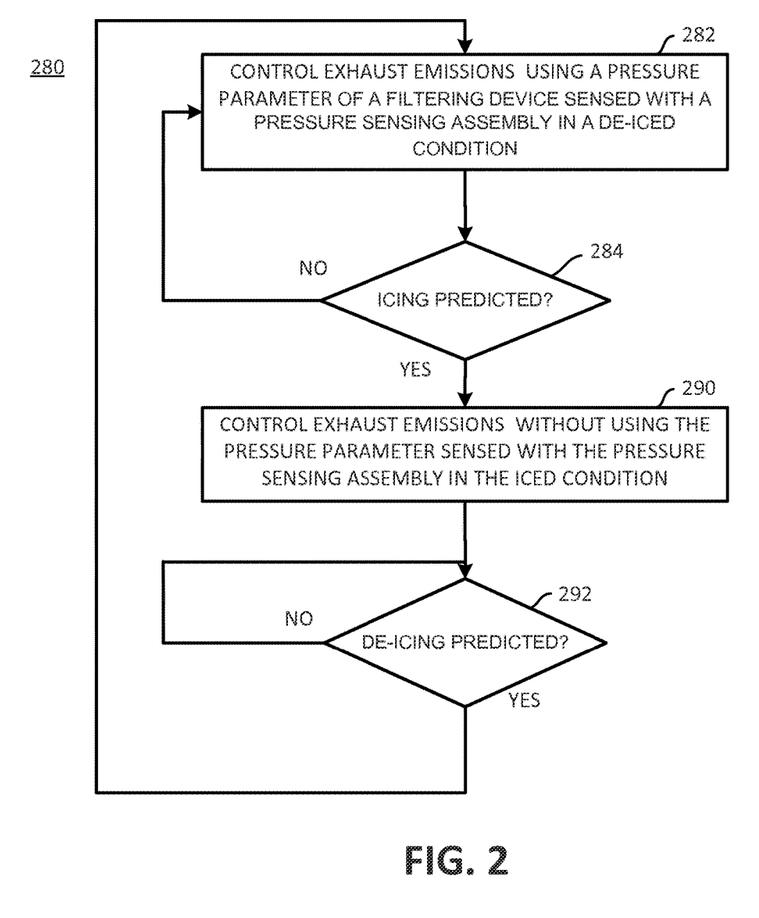
FIG. 2 is a flowchart of an embodiment of a control method to control an exhaust subsystem to control exhaust emissions of a combustions system.

FIG. 2 is a flowchart, denoted by numeral 280, of an embodiment of a control method to control an exhaust subsystem configured to control exhaust emissions of a combustions system. The method comprises, at 282, controlling exhaust emissions using a pressure parameter of a filtering device sensed with a pressure sensor assembly in a de-iced condition. The pressure parameter may be monitored continuously, during the de-iced condition and while the pressure sensor assembly is in an iced condition. The de-iced condition is normal while the iced condition is experienced in cold conditions. Cold conditions may be determined with an ambient temperature sensor or an engine temperature sensor, for example.

The method continues, at 284, with predicting an iced condition of the pressure sensor assembly. The iced condition may be predicted in several ways, described in detail below. Generally, the iced condition may be predicted if ambient and operating conditions may allow ice formation in the pressure sensor assembly. The ambient and operating conditions may include the absence of enough heat generated by the system and low ambient temperatures. An iced condition may also be determined if the pressure sensor assembly is malfunctioning. In one variation, responsive to predicting the iced condition, the method comprises controlling the exhaust emissions without using any pressure parameter of the filtering device sensed while in the iced condition. A pressure parameter of the filtering device may be sensed within the filtering device, or upstream or downstream thereof, in a supply or discharge exhaust gas pipe, for example, or as the outlet pressure of an upstream device or the inlet pressure of a downstream device. Well known techniques for controlling emissions rely on the estimation of soot load in DPF 206. The estimate may be based on the sensed pressure parameter alone or in combination with a soot load estimation determined without the sensed pressure parameter, for example a mass-balanced soot load rate. For example, in a combined soot load estimate the sensed pressure and the mass-balanced soot load rate are weighed to determine the soot load estimate, and the sensed value is given a much higher weight when it is trusted and no weight when it is not trusted. By giving it no weight, the combined soot load estimate can be predicted without using the sensed pressure parameter.

The method continues, at 290, with responsive to predicting the iced condition, controlling the exhaust emissions without using the pressure parameter sensed with the pressure sensor assembly in the iced condition. The pressure parameter may be sensed and stored to determine trends and statistical variation, for example, and these stored values may be used to model the operation of the combustion system and control exhaust emissions. However, the pressure parameters sensed in the iced condition are not trustworthy and are therefore not used to control exhaust emissions in the iced condition.

The method continues, at 292, with predicting a de-iced condition of the pressure sensor assembly. The de-iced condition may be predicted in several ways, described in detail below. Generally, the de-iced condition may be predicted if conditions may cause melting of ice in the pressure sensor assembly or if indications of malfunction cease to exist. The de-iced conditions may include the accumulation of heat in the system, risen ambient temperatures, and a determination that the pressure sensor assembly is no longer malfunctioning, and combinations thereof.

Responsive to predicting the de-iced condition, the method returns to 282 and continues, with controlling the exhaust emissions using the pressure parameter sensed with the pressure sensor assembly in the de-iced condition. In one variation, the prediction of iced condition is performed responsive to starting the combustion system, and once the de-iced condition is established, the method does not return to predicting whether there is an iced condition.

In some embodiments, the pressure parameter includes a differential pressure obtained with an inlet tube and an outlet tube and an outlet pressure is obtained with the outlet tube of the pressure sensor assembly.

In some embodiments, the method comprises generating a pressure signal corresponding with the pressure parameter sensed with the pressure sensor assembly, and controlling the exhaust emissions without using the parameter sensed with the pressure sensor assembly in the iced condition, e.g. the sensor-less control mode, comprises disregarding the pressure signal.

In some embodiments, the method comprises, responsive to predicting the iced condition, disabling a pressure sensor assembly diagnosis; and responsive to predicting the de-iced condition, enabling the pressure sensor assembly diagnosis. The pressure sensor assembly diagnosis evaluates the pressure parameter and generates a fault signal if a malfunction occurred. For example, a malfunction may be detected when the pressure parameter is outside a permitted range or has a response rate that is outside a permitted range. The malfunction may be due to icing of the pressure sensor assembly or due to damage, for example. If the pressure sensor assembly diagnosis is not disabled, a diagnostics panel may indicate the malfunction and cause an operator to shut-down the combustion system and initiate maintenance and repairs. The combustion system may be part of a vehicle, and the vehicle may have to be re-routed to perform maintenance or stopped while repairs are maintained, thereby potentially causing economic harm to the vehicle's operator. Alternatively, the diagnosis may indicate that regeneration is necessary when in fact it is not. By disabling the pressure sensor assembly diagnosis, operation of the combustion system, and the vehicle, may continue uninterrupted. To prevent operation with the pressure sensor assembly diagnosis disabled for an inordinate amount of time, which may be determined by regulatory agencies, a timer may be provided to return to the sensor control mode regardless of whether de-icing conditions have been determined.

In some embodiments, the iced condition is predicted by determining that a predetermined amount of heat was not provided by the combustion engine to the exhaust subsystem during an iced condition time. The amount of heat provided to the exhaust subsystem may be determined based on exhaust gases mass-flow and temperature, and may also be predicted based on combustion engine parameters such operating time, air density, fuel flow, torque, and temperature. At low load/torque, such as during idling or power take-off, the combustion engine does not generate as much heat as when it is fully loaded. Thus, more operating time is necessary at low torque to generate the same amount of heat generated at high torque during a shorter amount of time. The iced condition time is a predetermined amount of time. It is expected that any ice formed in the pressure sensor assembly will melt if the predetermined amount of heat is provided during the iced condition time. The iced condition time and the predetermined amount of heat may be variable to account for variations in operating conditions. In a vehicle, for example, the speed of travel and the ambient temperature may affect the temperature of the pressure sensor assembly, therefore more heat may be necessary to melt the ice at high speeds/low ambient temperatures relative to low speeds/near normal ambient temperatures. The iced condition time and the predetermined amount of heat may also depend on the location and exposure to the environment of the pressure sensor assembly. These values may be determined empirically or modelled mathematically for a particular combustion system and stored in tables depicting different operating conditions. In one variation, a heat (BTU) counter may be implemented to track the addition of heat to exhaust subsystem 200. The BTU counter can measure in both directions—when heat is added and when heat is rejected to the environment. If a predetermined count value is not reached, enough heat has not been provided.

In some embodiments, the iced condition is predicted by determining that a temperature is less than a low temperature threshold, and determining at least one of: an exhaust flow is less than an exhaust flow threshold, an exhaust temperature is less than an exhaust temperature threshold, and a combustion engine low-load time exceeds an engine low-load time threshold. The temperature may be an ambient air temperature or another temperature indicative of the condition of the pressure sensor assembly or the combustion engine. The low temperature threshold is a value selected to indicate that the temperature is sufficiently cold to produce ice in the pressure sensor assembly. The low temperature threshold corresponds to the temperature. Thus an ambient air temperature may have a different low temperature threshold than a temperature of the block of the combustion engine, for example. The combustion engine low-load time may be the time the combustion engine has been operating at low load, or has been shut-off. The engine low-load time threshold is the amount of time estimated for a particular combustion system to be enough to form ice given the amount of heat the combustion engine generates at the low load.

In some embodiments, the de-iced condition is predicted by determining a predicted value of the pressure parameter; updating an actual value of the pressure parameter with the pressure sensor assembly; and determining that the predicted value matches the actual value within an error threshold. Because the predicted and actual values match within an acceptable error, it can be concluded that the pressure sensor assembly is functioning correctly and is therefore not iced.

The pressure parameter may include at least one of a differential pressure, an outlet pressure, a differential pressure response rate, and an outlet pressure response rate. The differential pressure is obtained with an inlet tube and an outlet tube and the outlet pressure is obtained with the outlet tube of the pressure sensor assembly. The response rates are determined by comparison to historical performance values at given operating conditions. In other words, at given changing temperatures and loads, for example, the response rate of the pressure sensor assembly is characterized and the characterization values are compared to sensed values to determine if they are within the acceptable error thresholds. In some embodiments, determining that the predicted value matches the actual value within the error threshold includes comparing the at least one of the differential pressure, the outlet pressure, the differential pressure response rate, and the outlet pressure response rate with a corresponding predicted value and error threshold.

In some embodiments, responsive to predicting the iced condition, the method comprises: enabling a de-iced condition timer if a temperature is equal to or greater than a de-icing temperature threshold; and disabling the de-iced condition timer if the temperature is less than the de-icing temperature threshold, and predicting the de-iced condition comprises determining that the de-iced condition timer exceeds a de-iced condition time limit in a given amount of time. Thus, the temperature must be equal to or exceed the de-icing temperature for an aggregate time in excess of the de-iced condition time limit during the given amount of time. For example, de-icing may be determined if the temperature exceeds the de-icing temperature for a total of at least one hour (the time limit) during a two hour period (the given amount of time). In some embodiments, predicting the de-iced condition includes determining that a temperature is equal to or greater than a normal temperature threshold during a predetermined warming time. For example, de-icing may be determined if the temperature is equal to or greater than 50 deg. Fahrenheit (the normal temperature threshold) during the entirety of one hour (the warming time).

In some embodiments, predicting the de-iced condition includes determining that a predetermined amount of heat was provided by the combustion engine to the exhaust subsystem during a de-iced condition time. The predetermined amount of heat may be determined as the amount of heat sufficient to melt ice in the pressure sensor assembly tubes during normal operating conditions, or may be an amount of time based on operating conditions and thus having a plurality of values predetermined for a plurality of operating conditions. In one variation, the amount of heat is based on a mass flow and a temperature of the exhaust gases. In some embodiments, the BTU counter tracks the amount of heat added to the exhaust subsystem and rejected to the environment. If a predetermined count value is reached, enough heat has been provided to establish the de-iced condition.

ECM 104 receives data from various sensors, detectors, and components relating to engine and exhaust subsystem (200) conditions, and to generate control signals based on this information and perhaps other information, for example, stored in a database or memory integral to or separate from ECM 104. ECM 104 may include a processor and software modules or routines that are executable by the ECM 104. In alternative embodiments, ECM 104 may include electronic circuits for performing some or all of the processing, including analog and/or digital circuitry. The modules may comprise a combination of electronic circuits and microprocessor based components. For example, ECM 104 may receive data indicative of engine performance, and exhaust gas composition including but not limited to engine sensor data, such as engine position sensor data, speed sensor data, exhaust mass flow sensor data, fuel rate data, pressure sensor data, temperature sensor data from locations throughout the engine and the exhaust subsystem, NOx sensor data, and other data. ECM 104 may then generate control signals or outputs to control various components in the combustion engine and exhaust subsystem.

In certain embodiments, combustion system 100 includes a control system structured to perform certain operations. In certain embodiments, a controller forms a portion of a processing subsystem including one or more computing devices having memory, processing, and communication hardware. As used herein, ECM 104 is a controller and the functions and attributes of the controller described herein and in the following paragraphs are ascribed to ECM 104. The controller may be a single device or a distributed device, and the functions of the controller may be performed by hardware and/or as computer instructions on a non-transient computer readable storage medium.

In certain embodiments, the controller includes one or more modules structured to functionally execute the operations of the controller. The description herein including modules emphasizes the structural independence of certain aspects of the controller, and illustrates one grouping of operations and responsibilities of the controller. Other groupings that execute similar overall operations are understood within the scope of the present application. Modules may be implemented in hardware and/or as computer instructions on a non-transient computer readable storage medium, and modules may be distributed across various hardware or computer based components. The various functions of the different components can be combined or segregated as hardware and/or software modules in any manner, and can be useful separately or in combination. Input/output or I/O devices or user interfaces including but not limited to keyboards, displays, pointing devices, and the like can be coupled to the system either directly or through intervening I/O controllers. Thus, the various aspects of the disclosure may be embodied in many different forms, and all such forms are contemplated to be within the scope of the disclosure.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

One of skill in the art, having the benefit of the disclosures herein, will recognize that in certain embodiments of the present disclosure a controller may be structured to perform operations that improve various technologies and provide improvements in various technological fields. Without limitation, example and non-limiting technology improvements include improvements in combustion performance of internal combustion engines, improvements in emissions performance, aftertreatment system regeneration, engine torque generation and torque control, engine fuel economy performance, improved durability of exhaust subsystem components for internal combustion engines, and engine noise and vibration control. Without limitation, example and non-limiting technological fields that are improved include the technological fields of internal combustion engines, fuel systems therefore, aftertreatment systems therefore, air handling devices therefore, and intake and exhaust devices therefore.

Certain operations described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

Many aspects of the disclosure are described in terms of sequences of actions can be performed by elements of a computer system or other hardware capable of executing programmed instructions, for example, a general purpose computer, special purpose computer, workstation, or other programmable data processing apparatus. It will be recognized that in each of the embodiments, the various actions could be performed by specialized circuits (e.g., discrete logic gates interconnected to perform a specialized function), by program instructions (software), such as logical blocks, program modules, etc. being executed by one or more processors (e.g., one or more microprocessors, a central processing unit (CPU), and/or application specific integrated circuit), or by a combination of both. For example, embodiments can be implemented in hardware, software, firmware, middleware, microcode, or any combination thereof. The instructions can be program code or code segments that perform necessary tasks and can be stored in a non-transitory machine-readable medium such as a storage medium or other storage(s). A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents.

The non-transitory machine-readable medium can additionally be considered to be embodied within any tangible form of computer readable carrier, such as solid-state memory, magnetic disk, and optical disk containing an appropriate set of computer instructions, such as program modules, and data structures that would cause a processor to carry out the techniques described herein. A computer-readable medium may include the following: an electrical connection having one or more wires, magnetic disk storage, magnetic cassettes, magnetic tape or other magnetic storage devices, a portable computer diskette, a random access memory (RAM), a read-only memory (ROM), an erasable programmable read-only memory (e.g., EPROM, EEPROM, or Flash memory), or any other tangible medium capable of storing information.

Figure 3:
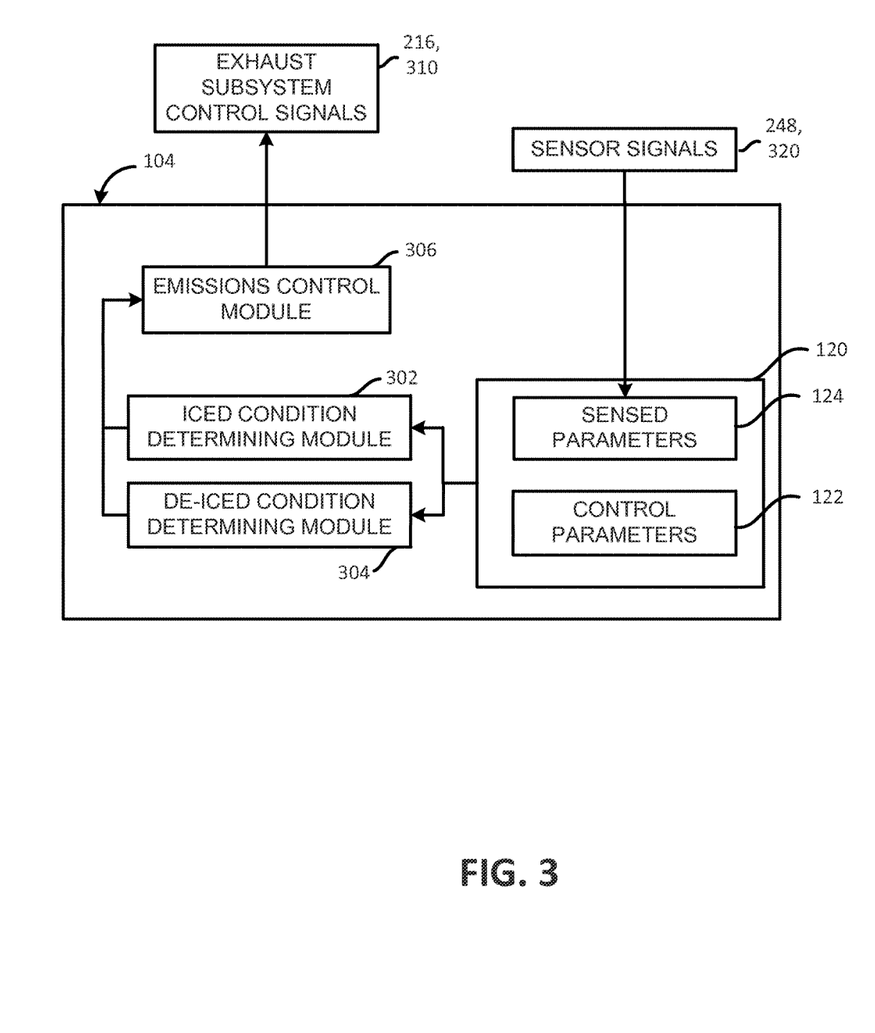
FIG. 3 is a block diagram of an embodiment of an engine control module.

FIG. 3 is a block diagram of an embodiment of ECM 104 comprising iced condition determining module 302, de-iced condition determining module 304, and emissions control module 306. Iced condition determining module is structured to evaluate sensed and control parameters 122, 124 which, as described above, to determine whether the pressure sensor assembly is in the iced condition. Sensed parameters 124 are obtained from sensor signals 248, 320. Sensor signals 320 may comprise signals from mass-flow, temperature, RPM, torque, and other sensors of combustion system 100. Whence iced condition determining module 302 determines that the iced condition is established, it signals emissions control module 306 to engage the sensor-less control module which causes emissions control module 306 to generate exhaust subsystem control signals 310 (including dosing control signal 216) using exhaust after-treatment control model 114 as described above. De-iced condition determining module 302 is structured to evaluate sensed and control parameters 122, 124 which, as described above, to determine whether the pressure sensor assembly is in the de-iced condition. Whence de-iced condition determining module 304 determines that the de-iced condition is established, it signals emissions control module 306 to engage the sensor control module which causes emissions control module 306 to generate exhaust subsystem control signals 310 (including dosing control signal 216) using exhaust after-treatment control model 114 as described above. Emissions control module 306 may generate exhaust subsystem control signals 310 in any known manner in the sensor control mode using the pressure parameter sensed by pressure sensor assembly 240, for example differential pressure and output pressure, and may generate exhaust subsystem control signals 310 in the same manner using a predicted pressure parameter instead of the sensed pressure parameter, or as described above by giving no weight to the sensed pressure parameter when a weighed model is used. The embodiment of ECM 104 may be incorporated in combustion system 100 or a subsystem thereof, as described above, and may be used to implement described with reference to FIG. 2.

Figure 4:
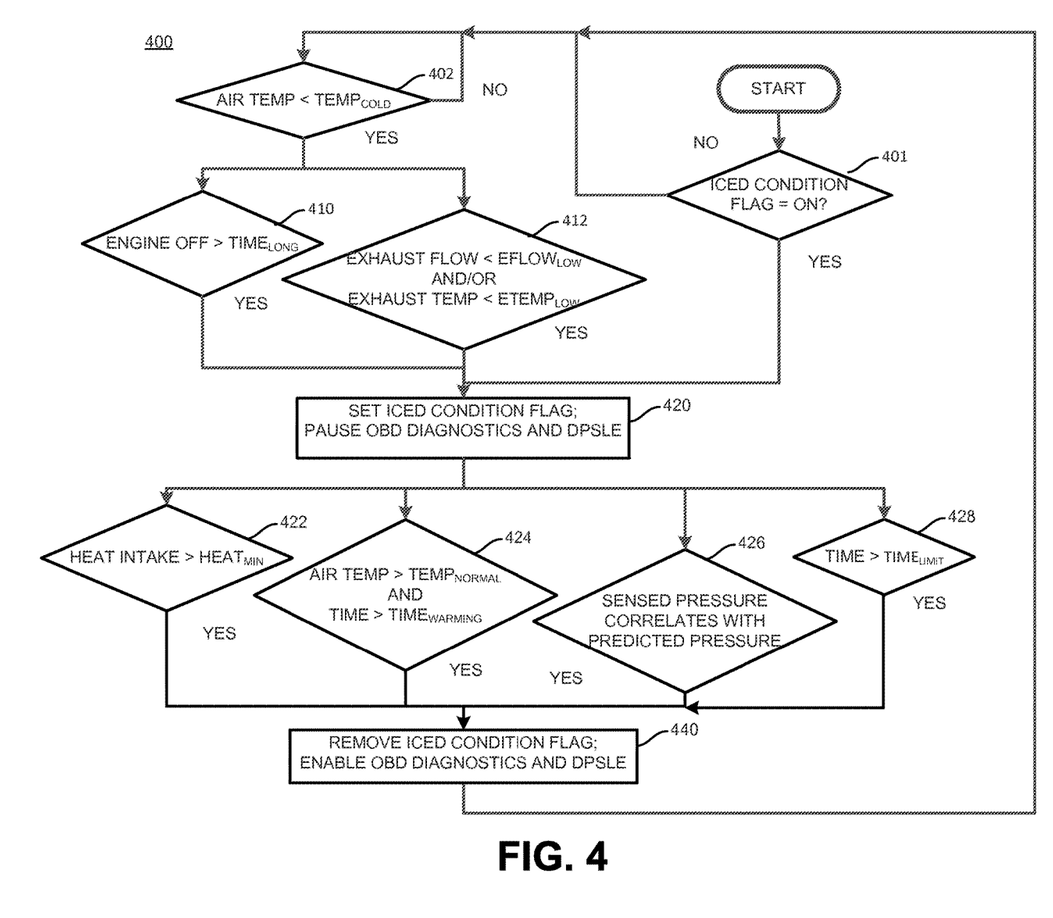
FIG. 4 is a flowchart of another embodiment of an exhaust emissions control method.

FIG. 4 is a flowchart, denoted by numeral 400, of another embodiment of an exhaust emissions control method. Optionally the method starts, at 401, with determining if the iced condition flag was set at the end of the last key cycle. If it was, the method proceeds to 420. If it was not, the method proceeds, at 402, with determining if the ambient air temperature is less than a low temperature threshold (TEMP$_{COLD}$). If it is, the method continues at 410 with determining whether a combustion engine low-load time exceeds an engine low-load time threshold (TIME$_{LONG}$) and at 412 with determining whether an exhaust flow is less than an exhaust flow low threshold (EFLOW$_{LOW}$) and/or an exhaust temperature is less than an exhaust temperature low threshold (ETEMP$_{LOW}$). If either of these conditions is true, the method continues at 420 with setting an iced condition flag, pausing pressure sensor assembly diagnosis (OBD DIAGNOSIS), and pausing use of the pressure parameter soot load estimate (DPSLE). When the pressure parameter soot load estimate is paused, a soot load estimate which does not rely on the sensed pressure parameter is used instead. If the temperature is too low, ECU 104 may increase the load on combustion engine 102 to generate heat and warm-up exhaust subsystem 200 and pressure sensor assembly 240. Techniques for increasing exhaust temperature are well known, and include increasing back-pressure and revving the engine while idling. Steps 401-412 determine whether the iced condition is established and step 420 is the resulting function of the establishment of the iced condition. Steps 402-420 may be performed by iced condition determining module 302. While two iced condition prediction paths are shown (410, 412), more or fewer iced condition prediction paths may be implemented.

Steps 422-440 are performed responsive to the determination that the iced condition is established and may be performed by de-iced condition determining module 304. At 422, the method continues with predicting the de-iced condition if a predetermined amount of heat (HEAT$_{MIN}$) was not provided by the combustion engine to the exhaust subsystem during an iced condition time. The de-iced condition is also predicted if a de-iced condition timer exceeds a de-iced condition time limit (TIME$_{LIMIT}$) in a given amount of time. At 424, the de-iced condition is also predicted if a temperature is equal to or greater than a normal temperature threshold (TEMP$_{NORMAL}$) during the entirety of a predetermined warming time (TIME$_{WARMING}$). The normal temperature threshold may be equal to or greater than the cold temperature threshold. At 426, the de-iced condition is also predicted if the sensed pressure correlates with the predicted pressure. As used herein "correlation" includes statistical correlation, for example with an $R^2$ value greater than 0.75, but also matching of the predicted and actual pressure values within an error threshold, e.g. when the two values differ by less than the error threshold over a period of time, or when their averages over a period of time differ by less than the error threshold, or by equivalent calculations intended to determine if the two values are statistically dependent. At 428, the de-iced condition is also predicted if a de-iced condition timer exceeds a de-iced condition time limit (TIME$_{LIMIT}$) in a given amount of time. This prevents operation in the sensor-less control mode over too long a time. If the de-iced condition is established, the method proceeds, at 440, with removing the ice condition flag; enabling pressure sensor assembly diagnosis (OBD DIAGNOSIS), and enabling use of the pressure parameter to calculate the soot load estimate (DPSLE). The ice condition flag may be a signal that indicates to emissions control module 306 whether to operate in the sensor-less control mode (when set) or the sensor control mode (when removed). Emissions control module 306 then control emissions in the sensor-less or sensor control mode. While four de-iced condition prediction paths are shown (422, 424, 426, 428), more or fewer de-iced condition prediction paths may be implemented.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

What is claimed is:
1. A method to operate a combustion system, the method comprising:
controlling exhaust emissions using a pressure parameter of a filtering device sensed with a pressure sensor assembly;
predicting an iced condition of the pressure sensor assembly;
responsive to predicting the iced condition,
controlling the exhaust emissions without using the pressure parameter sensed with the pressure sensor assembly in the iced condition;
enabling a de-iced condition timer if a temperature is equal to or greater than a de-icing temperature threshold; and
disabling the de-iced condition timer if the temperature is less than the de-icing temperature threshold;
predicting a de-iced condition of the pressure sensor assembly by determining that the de-iced condition timer exceeds a de-iced condition time limit in a given amount of time; and responsive to predicting the de-iced condition, controlling the exhaust emissions using the pressure parameter sensed with the pressure sensor assembly in the de-iced condition.

2. The method of claim 1, wherein the pressure parameter includes a differential pressure obtained with an inlet tube and an outlet tube and an outlet pressure is obtained with the outlet tube of the pressure sensor assembly.

3. The method of claim 1, further comprising, responsive to predicting the iced condition, controlling the exhaust emissions without using any pressure parameter of the filtering device sensed while in the iced condition.

4. The method of claim 1, further comprising:
receiving with an exhaust subsystem exhaust gases from a combustion engine of the combustion system;
processing the exhaust gases;
filtering the processed exhaust gases with the filtering device to remove particulate matter; and
generating a pressure signal corresponding with the pressure parameter sensed with the pressure sensor assembly,
wherein controlling the exhaust emissions without using the parameter sensed with the pressure sensor assembly in the iced condition comprises disregarding the pressure signal.

5. The method of claim 1, further comprising:
responsive to predicting the iced condition, disabling a pressure sensor assembly diagnosis; and
responsive to predicting the de-iced condition, enabling the pressure sensor assembly diagnosis.

6. The method of claim 1, further comprising receiving exhaust gases from a combustion engine with an exhaust subsystem exhaust of the combustion system, wherein predicting the iced condition includes determining that a predetermined amount of heat was not provided by the combustion engine to the exhaust subsystem during an iced condition time.

7. The method of claim 1, wherein predicting the de-iced condition includes:
determining a predicted value of the pressure parameter;
updating an actual value of the pressure parameter with the pressure sensor assembly; and
determining that the predicted value matches the actual value within an error threshold.

8. The method of claim 1, further comprising receiving exhaust gases from a combustion engine with an exhaust subsystem of the combustion system, wherein predicting the de-iced condition includes determining that a predetermined amount of heat was provided by the combustion engine to the exhaust subsystem.

9. The method of claim 1, wherein predicting the de-iced condition includes determining that a temperature is equal to or greater than a normal temperature threshold during the entirety of a predetermined warming time.

10. A method to operate a combustion system, the method comprising:
receiving exhaust gases from a combustion engine with an exhaust subsystem;
controlling exhaust emissions using a pressure parameter of a filtering device sensed with a pressure sensor assembly;
predicting an iced condition of the pressure sensor assembly;
responsive to predicting the iced condition, controlling the exhaust emissions without using the pressure parameter sensed with the pressure sensor assembly in the iced condition;
predicting a de-iced condition of the pressure sensor assembly, wherein predicting the de-iced condition includes determining that a predetermined amount of heat was provided by the combustion engine to the exhaust subsystem based on a mass flow and a temperature of the exhaust gases; and
responsive to predicting the de-iced condition, controlling the exhaust emissions using the pressure parameter sensed with the pressure sensor assembly in the de-iced condition.

11. A combustion system comprising:
a combustion engine generating exhaust gases;
an exhaust subsystem structured to receive the exhaust gases from the combustion engine;
a filtering device structured to remove particulate matter from the exhaust gases;
a pressure sensor assembly structured to sense a pressure parameter of the filtering device; and
a control module including control logic structured to:
predict an iced condition of the pressure sensor assembly,
responsive to predicting the iced condition, control exhaust emissions without using the pressure parameter sensed with the pressure sensor assembly in the iced condition,
predict a de-iced condition of the pressure sensor assembly, wherein predicting the de-iced condition includes determining that a predetermined amount of heat was provided by the combustion engine to the exhaust subsystem based on a mass flow and a temperature of the exhaust gases, and
responsive to predicting the de-iced condition, control the exhaust emissions using the pressure parameter sensed with the pressure sensor assembly in the de-iced condition.

12. The combustion system of claim 11, wherein controlling the exhaust emissions without using the pressure parameter sensed with the pressure sensor assembly comprises controlling the exhaust emissions without using any pressure parameter of the filtering device sensed while in the iced condition.

13. The combustion system of claim 11, the control logic further structured to:
responsive to predicting the iced condition, disable a pressure sensor assembly diagnosis; and
responsive to predicting the de-iced condition, enable the pressure sensor assembly diagnosis.

14. The combustion system of claim 11, wherein to predict the de-iced condition the control logic is structured to:
determine a predicted value of the pressure parameter;
update an actual value of the pressure parameter with the pressure sensor assembly in the de-iced condition; and
determine that the predicted value matches the actual value within an error threshold.

15. The combustion system of claim 11, wherein to predict the de-iced condition the control logic is structured to determine that a temperature is equal to or greater than a normal temperature threshold during the entirety of a predetermined warming time.

16. A combustion system comprising:
a combustion engine generating exhaust gases;
an exhaust subsystem structured to receive the exhaust gases from the combustion engine;
a filtering device structured to remove particulate matter from the exhaust gases;

a pressure sensor assembly structured to sense a value of a pressure parameter of the filtering device; and a control module including control logic structured to:
predict an iced condition of the pressure sensor assembly, wherein responsive to predicting the iced condition, the control logic is structured to:
enable a de-iced condition timer if a temperature is equal to or greater than a de-icing temperature threshold; and
disable the de-iced condition timer if the temperature is less than the de-icing temperature threshold,
predict a de-iced condition of the pressure sensor assembly, wherein predicting the de-iced condition comprises determining that the de-iced condition timer exceeds a de-iced condition time limit in a given amount of time, and
responsive to predicting the de-iced condition, control the exhaust emissions using the pressure parameter sensed with the pressure sensor assembly in the de-iced condition.

17. A control module for a combustion system including a combustion engine and an exhaust subsystem configured to control exhaust emissions, the control module comprising control logic structured to:
predict an iced condition of a pressure sensor assembly,
responsive to predicting the iced condition, control exhaust emissions without using a pressure parameter of a filtering device sensed with the pressure sensor assembly in the iced condition,
predict a de-iced condition of the pressure sensor assembly, wherein predicting the de-iced condition includes determining that a predetermined amount of heat was provided by the combustion engine to the exhaust subsystem based on a mass flow and a temperature of the exhaust gases, and
responsive to predicting the de-iced condition, control the exhaust emissions using the pressure parameter sensed with the pressure sensor assembly in the de-iced condition.

18. The control module of claim 17, wherein controlling the exhaust emissions without using the pressure parameter sensed with the pressure sensor assembly comprises controlling the exhaust emissions without using any pressure parameter of the filtering device sensed while in the iced condition.

19. The control module of claim 17, wherein to predict the de-iced condition the control logic is structured to:
determine a predicted value of the pressure parameter;
update an actual value of the pressure parameter with the pressure sensor assembly in the de-iced condition; and
determine that the predicted value matches the actual value within an error threshold.

20. A control module for a combustion system including a combustion engine and an exhaust subsystem configured to control exhaust emissions, the control module comprising control logic structured to:
predict an iced condition of a pressure sensor assembly;
responsive to predicting the iced condition:
enable a de-iced condition timer if a temperature is equal to or greater than a de-icing temperature threshold; and
disable the de-iced condition timer if the temperature is less than the de-icing temperature threshold;
predict a de-iced condition of the pressure sensor assembly, wherein predicting the de-iced condition comprises determining that the de-iced condition timer exceeds a de-iced condition time limit in a given amount of time, and
responsive to predicting the de-iced condition, control the exhaust emissions using a pressure parameter sensed with the pressure sensor assembly in the de-iced condition.

* * * * *